United States Patent Office 3,361,814
Patented Jan. 2, 1968

3,361,814
CYCLOALIPHATIC TETRAAMINES
Clyde D. Campbell, Wheeling, and James M. Cross and Sidney H. Metzger, Jr., New Martinsville, W. Va., assignors to Mobay Chemical Company, Pittsburgh, Pa., a corporation of Delaware
No Drawing. Filed Sept. 18, 1964, Ser. No. 397,645
5 Claims. (Cl. 260—563)

ABSTRACT OF THE DISCLOSURE

Bis(methyl, diaminocyclohexyl)alkanes are prepared by reacting isomers or mixtures of isomers of tolylene diamine with formaldehyde and then hydrogenating this reaction product. The amino compounds are useful in the preparation of polyfunctional isocyanates suitable for use in the preparation of polyurethanes.

This invention relates to cycloaliphatic tetraamines and more particularly to bis(methyl, diaminocyclohexyl) alkanes.

It has been heretofore known to prepare aromatic polyamines by reacting mixtures of amines such as aniline, ortho-toluidine and meta-toluene diamine with formaldehyde. These aromatic polyamines are solids which can be converted into the corresponding isocyanate by phosgenation.

It is an object of this invention to prepare cycloaliphatic tetraamines. It is another object of this invention to prepare bis(methyl, diaminocyclohexyl)alkanes. It is another object of this invention to prepare cycloaliphatic tetraamines using tolylene diamine as a starting material. It is still another object of this invention to prepare bis-(methyl, diaminocyclohexyl)methanes. It is a further object of this invention to prepare bis(2,4-diamino-5-methylcyclohexyl)methane.

The foregoing objects and others which will become apparent from the following description are accomplished in accordance with the invention generally speaking, by providing bis(methyl, diaminocyclohexyl)alkanes having the formula

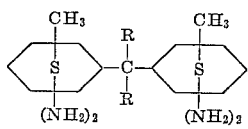

where R is hydrogen, lower alkyl or phenyl. Compounds in accordance with the formula are prepared by reacting tolylene diamine with an aldehyde or ketone such as, for example, formaldehyde, acetaldehyde, benzaldehyde, propionaldehyde, butyraldehyde and the like, acetone, diethyl ketone, methylethyl ketone, methylpropyl ketone, methylisobutyl ketone, methyl-n-amyl-ketone and the like, and then reducing the aromatic rings to cycloaliphatic rings utilizing conventional hydrogenation catalysts.

In the preparation of the aromatic tetraamine, any isomer or mixtures of isomers of tolylene diamine such as, for example, 2,4-tolylene diamine, 2,6-tolylene diamine, 2,5-tolylene diamine, 3,5-tolylene diamine, 2,3-tolylene diamine and 3,4-tolylene diamine can be used. It is preferred to use 2,4-tolylene diamine or mixtures of 2,4- and 2,6-tolylene diamine in the preparation of the tetraamine by reacting with an aldehyde.

The hydrogenation is carried out under pressure in an inert solvent such as dioxane and in the presence of a hydrogenation catalyst by conventional techniques. Any suitable catalyst may be used such as, fo rexample, platinum, palladium, Raney nickel, rhodium, ruthenium and the like. It has been found that ruthenium dioxide is a particularly good catalyst for the hydrogenation. The temperature of the reaction should be maintained at least about 125° C. under a hydrogen pressure of at least about 4000 p.s.i.g.

The invention is further illustrated but not limited by the following examples in which parts are by weight unless otherwise specified.

EXAMPLE 1

*Preparation of aromatic tetraamine*

About 30 parts of formaldehyde are added to about 250 parts of 2,4-tolylene diamine and about 900 parts of an 11% sulphuric acid solution. The condensation takes place and the tetraamino product having the formula

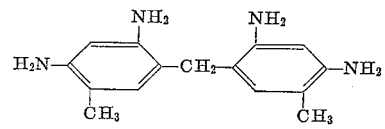

is recrystallized from 1,4-dioxane, having a melting point of from 202° to 204° C.

EXAMPLE 2

*Preparation of cycloaliphatic tetraamine*

In a one-liter stainless steel stirred autoclave is charged about 19.7 parts of bis(2,4-diamino-5-methylphenyl) methane, about 2.0 parts of ruthenium dioxide and about 200 parts by volume of dioxane (distilled from sodium). The autoclave is purged several times with hydrogen by building the pressure to 200–250 p.s.i.g. and bleeding. The contents of the autoclave are heated to about 142° C. and then pressured to about 4500 p.s.i.g. with hydrogen. After stirring 22 hours at from about 134 to about 155° C. a sample is removed for infrared analysis. The spectrum shows a considerable reduction of the benzoid rings to cyclohexyl rings. The reduction is continued for an additional 23 hours at from about 144 to about 154° C. After cooling, the contents of the autoclave are filtered under suction through a preformed charcoal filter cake. The dioxane is stripped in vacuo leaving a light red oil, which is very viscous at room temperature, but rapidly thins with heat. The infrared spectrum shows only a trace of aromatic material left and is consistent with the following structure

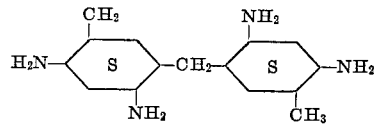

The compound is soluble in water.

EXAMPLE 3

The procedure of Example 2 is repeated with the exception that 19.7 parts of tetraamine are prepared by reacting an isomeric mixture of 80% 2,4- and 20% 2,6-tolylene diamine with formaldehyde. The reaction conditions are similar, and the product is a mixture of the following compounds:

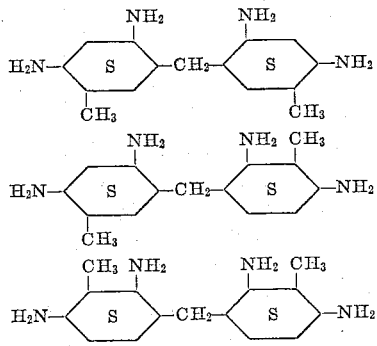

It is, of course, to be understood that any of the aldehydes or ketones, isomers of tolylene diamine and catalysts, may be used throughout the examples in place of those particularly used. The compounds of this invention are useful as curing agents for glycidyl ethers and urethanes and also as intermediates in the preparation of isocyanates.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. 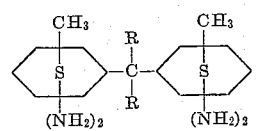

where R is a member selected from the group consisting of hydrogen, a lower alkyl and phenyl.
2. Bis(methyl, diaminocyclohexyl)alkanes.
3. Bis(methyl, diaminocyclohexyl)methanes.
4. Bis(2,4-diamino-5-methylcyclohexyl)methane.
5. Bis(2,4-diamino-3-methylcyclohexyl)methane.

No references cited.

CHARLES B. PARKER, *Primary Examiner.*

P. C. IVES, *Assistant Examiner.*